United States Patent Office 2,968,967
Patented Jan. 24, 1961

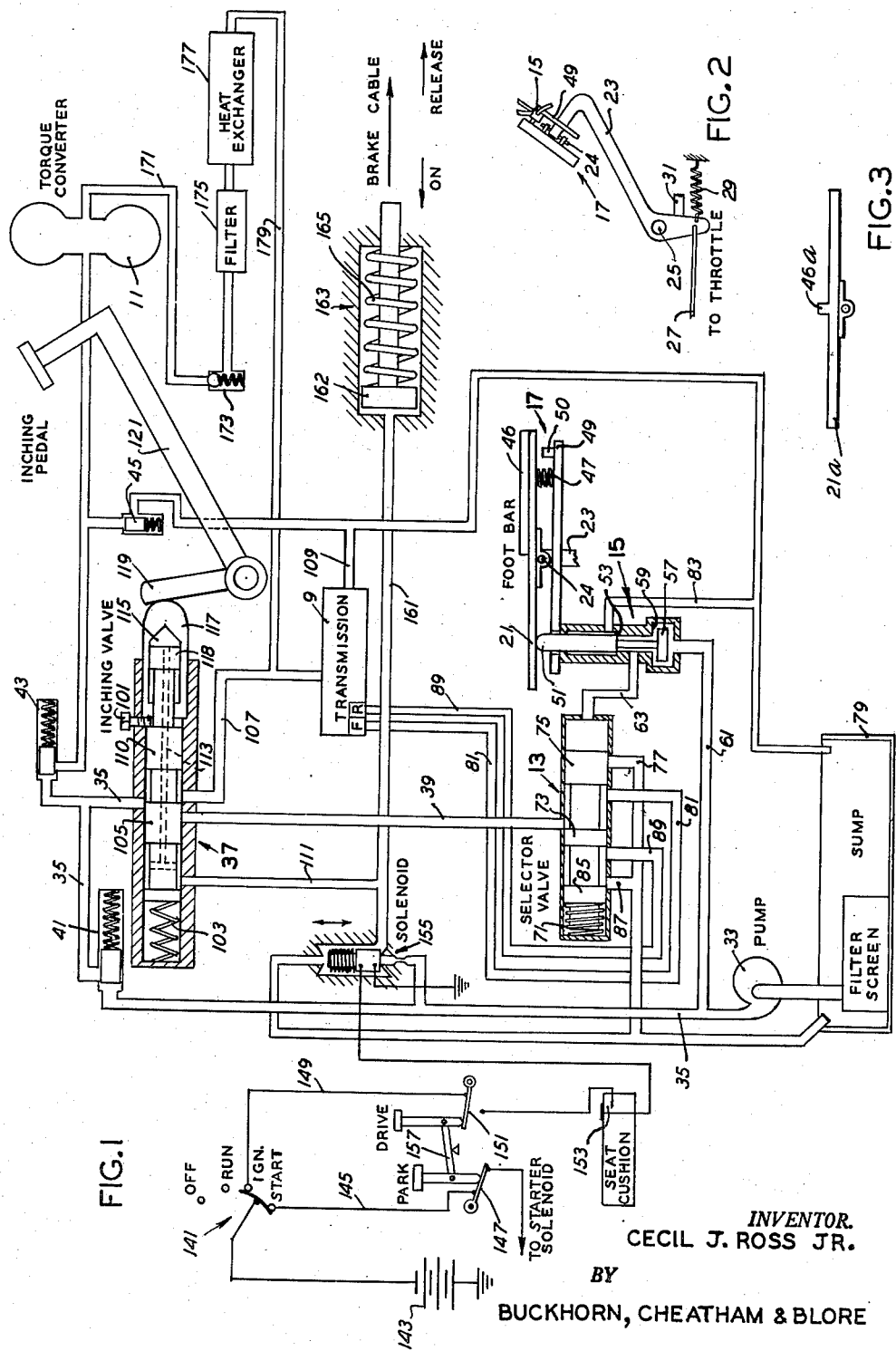

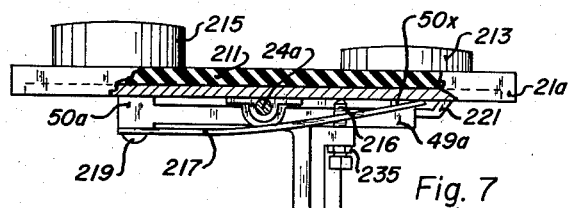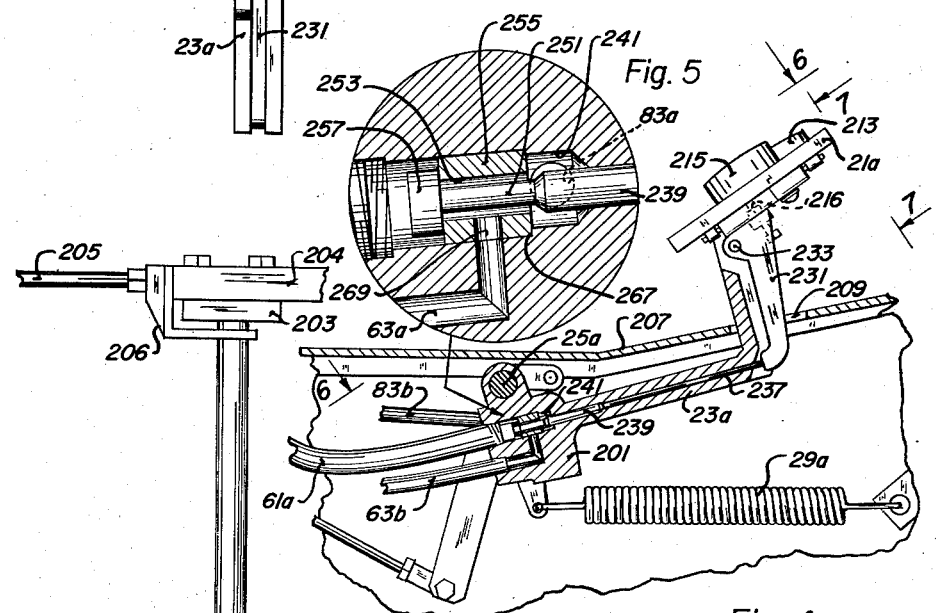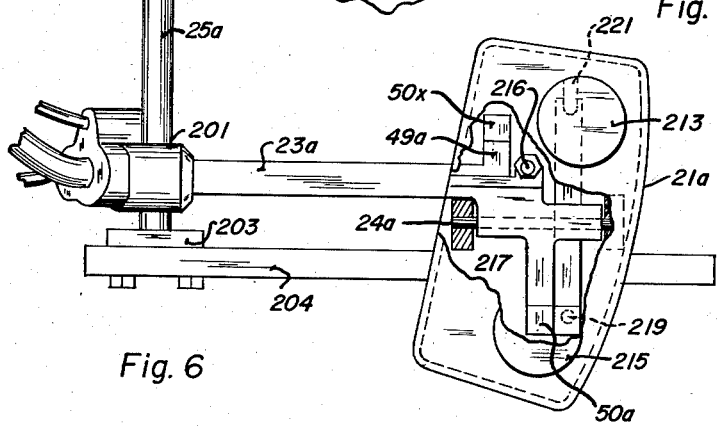

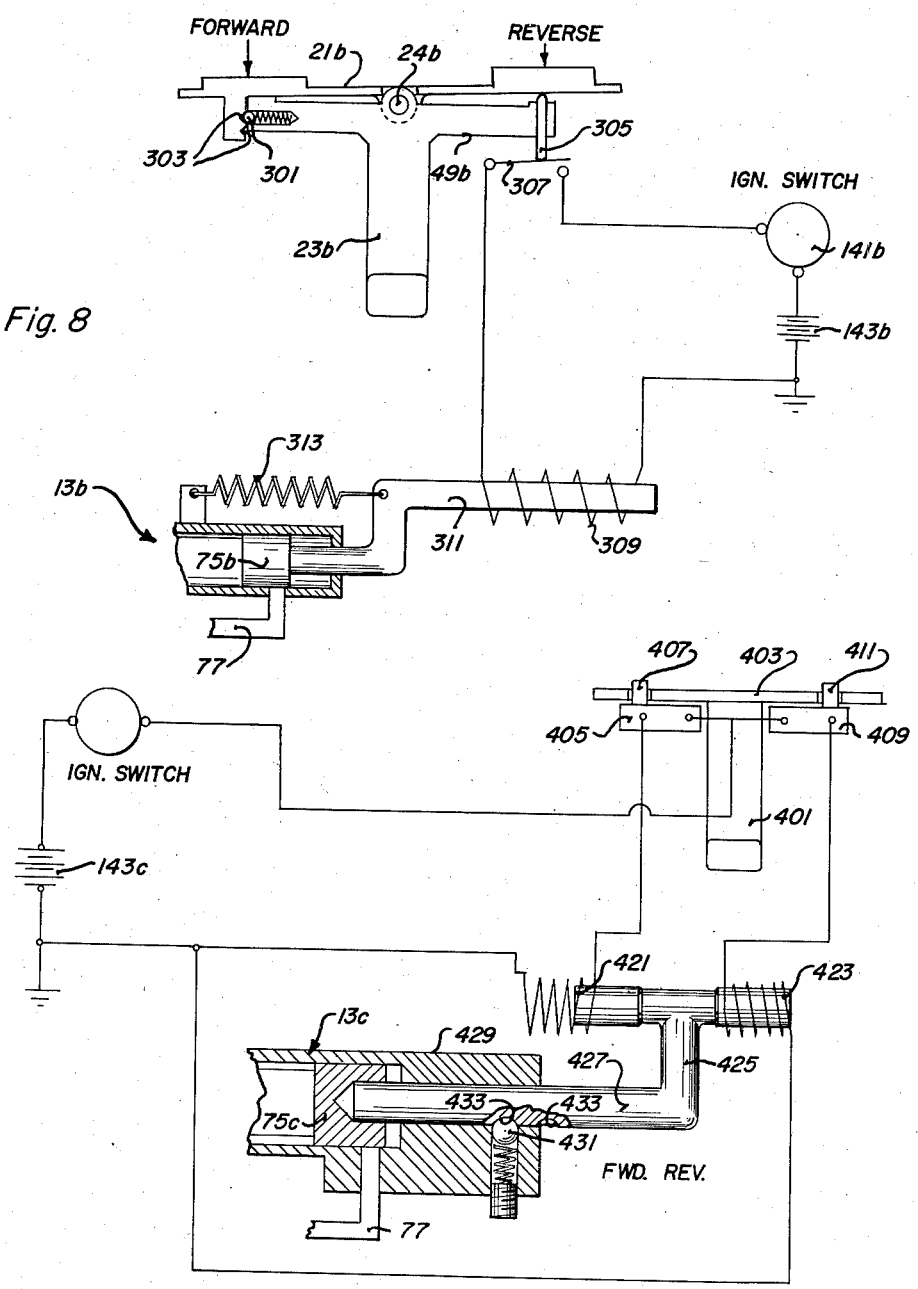

2,968,967

DRIVE SYSTEM FOR LIFT TRUCK

Cecil J. Ross, Jr., Portland, Oreg., assignor to Hyster Company, Portland, Oreg., a corporation of Nevada Filed Apr. 20, 1959, Ser. No. 807,512

10 Claims. (Cl. 74—472)

This invention relates to vehicles and particularly to the drive systems of lift trucks. This application incorporates the subject matter of my prior co-pending application filed March 3, 1958, Serial No. 718,531, now abandoned, and entitled "Drive System for Lift Truck," and is a continuation-in-part thereof.

There has been a constant demand for simplifying the controls for the drive systems of lift trucks to enable the loading and unloading operations to be carried out faster and easier. Since the operator is required to manipulate one or more levers for hoisting a load and tilting the mast of the truck, and also is required to steer the vehicle, it is apparent that if he must also manipulate levers to effect forward and reverse shifting of the truck, some of the operations just described must be performed sequentially rather than simultaneously. This obviously slows down load handling operations.

It is a main object of the present invention to provide a vehicle, particularly a lift truck, having a drive system by which the truck may be shifted from forward to reverse or vice versa by foot operation alone, which system is simpler than prior foot-operated systems.

A more specific object of the invention is to provide a truck having a single pedal so constructed that forward or reverse drive may be effected by proper manipulation of the foot pad of the pedal, which pedal is so constructed that throttle operation is achieved by the same motion regardless of whether the truck is in forward or reverse drive.

Various other objects of the invention will be apparent from the following drawings wherein:

Fig. 1 is a schematic view of a drive system of the present invention, showing the parts in the positions they occupy when the truck engine is being started;

Fig. 2 is a side view in elevation of the foot pedal of the drive system;

Fig. 3 is an edge view of a modified form of pedal pad;

Fig. 4 is an elevational view of a modified form of pedal, certain parts being in section for convenience in illustration;

Fig. 5 is an enlarged view of a portion of Fig. 4;

Fig. 6 is a view taken in the direction of the arrows 6—6 of Fig. 4, the floor board being shown as removed;

Fig. 7 is a view taken in the direction of the arrows 7—7 in Fig. 4, parts being shown in section for convenience;

Fig. 8 is a schematic view of another modified form of invention; and

Fig. 9 is a schematic view of a further modified form of invention.

*General description*

Referring to the accompanying drawings, the drive system includes a transmission 9 which has a pair of independently operable fluid-actuated friction clutches, labeled F for forward drive and R for reverse drive. These clutches are so arranged in the transmission that when the forward clutch is supplied with fluid under pressure the clutch is engaged and the transmission is placed in forward drive, and the reverse clutch is so arranged that when it is supplied with fluid under pressure, it will be engaged to place the transmission in reverse drive. The transmission includes a torque converter 11 which for convenience is shown separately from the box labeled "transmission."

This general type of transmission is of conventional construction and thus a detailed description of it is not necessary. However, certain features for cooling the clutches of the transmission, to be explained hereinafter, are not conventional.

The supply of fluid under pressure to the transmission is controlled by an assembly including a selector valve 13, a control valve 15 and a pedal 17. The pedal includes a foot pad 21 mounted at its midpoint on a pedal arm 23 for pivotal movement about a pin 24 which extends generally longitudinally of the truck. The arm 23 is itself mounted for pivotal movement on a shaft 25 which extends generally transversely of the truck as shown in Fig. 2. A link 27 extends from the lower end of the pedal arm to the throttle of the truck and a spring 29 urges the pedal arm to assume a rest position against a stop 31.

A pump 33 supplies fluid under pressure through a line 35 to an inching valve 37 which in one of its positions allows the fluid to pass through a line 39 to the selector valve 13. It will be assumed in the following description that fluid is supplied through the line 39 to the selector valve 13. A number of pressure control relief valves 41, 43 and 45 are employed in the system to provide the desired pressures at the desired places.

When the left-hand side of the food pad, as the parts are shown in Fig. 1, is depressed, fluid under pressure will be supplied through the selector valve 13 from the line 39 to the forward fluid-activated friction clutch F of the transmission 9 to place the truck in forward drive, and is also such that when the right-hand side of the pad is depressed, fluid under pressure will be supplied through the selector valve 13 to the reverse fluid-activated friction clutch R of the transmission to place the truck in reverse drive.

The force required to depress the foot pad to change the drive from forward to reverse or vice versa is less than that required to pivot the pedal arm 23 away from the stop 31 and thus the pedal arm will remain against the stop during tilting movement of the foot pad 21. The foot pad has no neutral position and thus if it is assumed that the truck engine is in operation, the truck may be driven forwardly or rearwardly slowly even though the pedal arm is against the stop 31, because the truck engine will be idling when the arm is so positioned and even at idle speed some power is delivered from the torque converter to the drive wheels of the truck.

However, if the operator decides to move forwardly or rearwardly at an increased rate of speed, after he has moved the foot pad to the desired selected position, he increases the pressure on the foot pad to pivot the pedal arm 23 away from the stop 31 to operate the throttle link 27 and increase the speed of the truck engine. It is thus apparent that the selection of the forward or reverse drive is independent of the actuation of the throttle, and that the force applied to the pedal to actuate the throttle is in the same direction for both forward and reverse drive.

It is further pointed out that the system is so designed that any time the pump 33 is in operation the foot pad will remain in the position to which it is tilted until moved therefrom, so that the operator may remove his foot from the foot pad without changing the "forward" or "reverse" selection previously made. One advantage of this is when the truck is going down an incline, the operator may remove his foot from the foot pad and allow engine compression to retard the movement of the truck. Obviously, if the transmission shifted to "neutral" under these conditions, engine compression would not be available.

*Detailed description*

The pad 21 may have a plain upper surface, but preferably a step 46 or equivalent means is provided so that the operator is apprised at all times by the presence of the step as to whether his foot is resting against the "forward" or "reverse" side of the pad and also physically defines the "forward" and "reverse" sides of the pad. Fig. 3 shows a pad 21a having a central rib 46a performing a function similar to that performed by the step 46. Both the step 46 and the rib 46a will tend to require the operator to lift his foot off the pad when shifting from forward to reverse or vice versa, thus slowing down the engine so that the shift occurs at a relatively low speed.

The food pad 21 is urged by a compression spring 47 to assume its "forward" position shown in Fig. 1. The spring 47 is arranged between the right-hand end of the foot pad 21 and a wing piece 49 fixedly secured to the upper portion of the arm 23. The control valve 15 is mounted on and carried by the wing piece 49 at the left-hand end thereof in a position so that the movable valve member of the valve engages the underside of the left-hand end of the foot pad. This valve member includes an upper portion 51 which is seated on a seat 53 formed in the valve body whenever the foot pad is in its "forward" position. Thus, the seat limits tilting movement of the foot pad in a counterclockwise direction, as the parts are shown in Fig. 1. A stop lug 50 on the right-hand end of the wing limits clockwise movement of the foot pad. The amount of movement of the foot pad is very small. In fact, in one machine the total tilt was only two degrees. This means that the general position of the pad remains unchanged and there is no tendency for the foot of the operator to slip off one side or the other of the foot pad.

The movable valve member of the valve 15 also includes a lower portion 57 of larger diameter than the upper portion 51 and connected to the upper portion by a reduced central portion. The enlarged lower portion 57 will engage a seat 59 formed in the valve body whenever the foot pad is tilted to its "reverse" position because the valve member will rise under the influence of fluid pressure applied thereto from a line 61 connected to the pump 33.

Prior to the closure of valve portion 57 against seat 59, the upward force created against the valve member by the fluid pressure supplied by the line 61 is not great enough to raise the valve member against the resistance of the spring 47. Thus, the foot pad 21 will remain in its "forward" position until moved therefrom by foot operation.

Whenever the valve portion 57 is unseated, fluid under pressure is supplied from the valve 15 to valve 13 through a line 63, provided, of course, the pump 33 is in operation. However, when the portion 57 is seated against the seat 59, the pressure against the enlarged portion 57 is sufficient to hold the foot pad in its "reverse" position against the pressure of the spring 47 because the portion 57 is enough larger in diameter than 51 to overcome the spring. Therefore, the foot pad will remain in its "reverse" position or its "forward" position when moved to either despite the release of applied force against the foot pad.

When pressure is supplied to the valve 13 through the line 63, the pressure forces the movable valve member of the valve 13 toward the left against the resistance of a spring 71 to dispose an enlarged portion 73 of the valve member to the left of the inlet pressure line 39 and dispose an enlarged portion 75 over an outlet or exhaust line 77 which leads to a sump 79. With the valve member so positioned, fluid under pressure from the line 39 can pass through the valve 13 outwardly through a line 31 which is connected to the "forward" fluid-activated clutch F of the transmission 9.

When the pressure from the line 63 is cut off by the seating of the enlarged portion 57 against the seat 59, fluid under pressure within the right-hand end of the valve body of valve 13 can pass backwardly through the line 63 and upwardly through the valve body of the valve 15 and out through an exhaust line 83 which leads to the sump 79. Thus, the spring 71 can force the valve member of the valve 13 toward the right so that the enlarged portion 73 is disposed at the right-hand side of the line 39 and an enlarged portion 85 of the valve member is disposed in a position to prevent fluid under pressure which enters the valve through line 39 from flowing out an exhaust line 87. Fluid under pressure therefore passes outwardly through an outlet line 89 which leads to the "reverse" fluid-activated clutch R of the transmission 9.

A summary of the above operation shows that when the foot pedal is in its "forward" position shown in Fig. 1 with the left-hand end of the pad 21 depressed, the valve member of the valve 15 is disposed such that the upper portion 51 is seated and the lower portion 57 is unseated. Thus fluid under pressure is supplied through the line 63 to the right-hand end of the valve body of the valve 13 to shift the valve member to the left to the position shown in Fig. 1. Under these conditions, assuming that fluid under pressure is supplied through line 39 to the valve 13, fluid will be supplied through the line 81 to the "forward" fluid-activated clutch F of the transmission 9 to place the truck in condition for forward motion.

If the right-hand side of the foot pad 21 is depressed the pressure below the valve member of the valve 15 will force the valve member upwardly to cause the portion 57 to seat and cut off the pressure from the line 63, and the valve member also allows the pressure in the line 63 to exhaust through the line 83. Thus, the spring 71 shifts the valve member of valve 13 to the right to allow fluid under pressure from the line 39 to pass through the valve and out through line 89 to the "reverse" fluid-activated clutch R of the transmission 9.

*Inching valve*

During the description of the operation of the selector valve 13, it has been assumed that fluid is supplied to the selector valve from the supply line 35 through the inching valve 37 and to the line 39. However, as shown in Fig. 1, the valve member of the inching valve is in a position blocking the line 39. This is because the inching valve is in its inoperative position, such as, when the truck is not in operation or is being started. However, when the truck is in normal operation, the inching valve will usually be open to the supply of fluid therethrough from the line 35 to the line 39. An exception to this is when the inching pedal is in its fully depressed position, as will be presently apparent.

The inching valve 37 includes a main movable valve member which is urged to the right against a stop 101 by a compression spring 103. In this position, an enlarged portion 105 of the main valve member covers the outlet to the line 39 and almost covers the inlet from the line 35. However, the enlarged portion does not quite cover the inlet line and thus fluid under pressure from the line 35 passes through the valve and into an outlet line 107 leading to the transmission 9. This fluid is utilized to cool the clutches F and R of the transmission and it merely passes around the parts to be cooled and then out through an exhaust line 109 leading to the sump 79.

The main valve member of valve 37 includes an enlarged portion 110 which will close the outlet line 107 when the valve member moves fully to the left, but will not close line 35 although it may project slightly over the inlet end of this line.

The valve member will move to the left when pressure is supplied to the valve through a line 111, but pressure will not be so supplied when the truck is being started or before being started for reasons presently to appear. When fluid under pressure is supplied to the valve through the line 111, the fluid flows through a passage 113 formed in the valve member into a chamber 115 formed within an auxiliary valve member 117 which slidably projects into the right-hand end of the valve body of the valve 37 and slidably receives the right-hand end of the main valve member. This right-hand end has an enlarged portion 118 slidably fitting within the auxiliary valve member and adapted to abut against the left-hand end of the auxiliary valve member when the main valve member has been moved fully to its left.

An arm 119 which is fixed to an inching pedal 121 engages the right-hand end of the auxiliary valve member, and a spring not shown urges the pedal in a direction forcing the auxiliary valve member against the stop 101. This spring is strong enough to retain the inching pedal in its elevated position against the force of the fluid pressure within the chamber 115 as delivered by the line 111. However, this fluid pressure force is sufficient to move the main valve member to the left against the resistance of the spring 103 so that the enlarged portion 110 closes off the flow of fluid through the line 35 to the line 107 but permits the flow of fluid under pressure from the line 35 to the line 39.

Assuming that the main valve member has been moved fully toward the left, the main and auxiliary valve members will be fully extended relative to one another. Now, if the pedal 121 is depressed somewhat, the main and auxiliary valve members will move to the right as a unit under the influence of the compression spring 103. This means that the outlet to the line 39 will be partly shielded or covered by the enlarged portion 105, thus reducing the volume of fluid under pressure supplied from the line 39 to the valve 13. Thus the amount of fluid supplied to the "forward" and "reverse" fluid-activated clutches of the transmission 9 is reduced.

These fluid-activated clutches are provided with orifices to allow the slow escape of fluid therefrom, and because of the reduced volume of supplied fluid and because of the escape of fluid, the force applied to engage a clutch is less than under normal conditions and thus the clutch will slip slightly, or to a considerable extent depending on the volume supplied through the line 39. This means that the truck will move or "inch" at a slow speed, even though the engine might be running at full speed as required to operate the hoist pump (not shown). Thus, while the operator is approaching the load depositing or pick up station, he may rapidly move the carriage to a desired position while the truck slowly approaches such position.

If the inching pedal is fully depressed, the main valve member will be moved to its Fig. 1 position cutting off the supply of fluid to the transmission. The pedal is connected to the brakes of the vehicle so that when the pedal is fully depressed the brakes are applied. This facilitates control of the inching of the truck.

*Starting system*

The starting system includes a starting switch 141 movable from an "off" position to a "run" position or to a "start" position shown in Fig. 1. In the latter position, current is supplied from a battery 143 through a conductor 145 to a park switch 147 which is connected to a starter solenoid not shown. When the switch 141 is in either its "start" or "run" positions, current is also supplied through a conductor 145 to a drive switch 151, and a seat cushion switch 153 and also to a solenoid valve 155, when the switches 151 and 153 are closed. The valve 155 is biased to assume a closed position. The park and drive switches are mounted on a lever 157 so that when the park switch is closed the drive switch is open and vice versa.

In starting the vehicle, the driver will automatically close the switch 153 by sitting on the seat cushion associated with the switch. He will then depress the park switch and turn the ignition switch 141 to its "start" position to start the engine of the truck. At this time, because the drive switch 151 is open, the solenoid valve 155 will be deenergized and therefore will remain closed so that fluid cannot be supplied from the line 35 through the solenoid valve to the line 111. Thus the inching valve will keep the line 39 closed and it follows that even though the pump 33 is in operation, the fluid-activated clutches of the transmission remain disengaged because fluid under pressure will not be supplied through the line 39 and the selector valve 13 to the transmission.

However, the operator will now depress the drive switch 151 so that current is supplied to the solenoid valve 155 to open the same and enable fluid from the line 35 to flow to the line 111. Also, fluid under pressure will flow through a line 161 against a piston 162 of a brake unit 163 which has a spring 165 normally setting the brakes. When fluid under pressure from line 161 forces the piston to the right, the brakes will be released.

When pressure is supplied through the line 111 to the inching valve 137, the main valve member will be moved to the left, because of the pressure in the chamber 115, to allow fluid under pressure from the line 35 to pass into the line 39 and through the selector valve to the "forward" fluid-activated clutch of the transmission. Thus, the "forward" fluid-activated clutch will be fully engaged, and the truck will tend to move forwardly.

It may now be assumed that it is desired to drive the truck in a "reverse" direction, and this is accomplished by pressing on the right-hand side of the foot pad 21 to place the transmission in reverse drive. Now the operator increases the pressure against the foot pad but since the foot pad cannot pivot farther, this pressure causes the pedal arm 23 to pivot about the axis of shaft 25 to increase the speed of the engine and drive the truck rearwardly. By simply pressing on the left-hand side of the foot bar the operation may shift the transmission from "reverse" drive to "forward" drive.

It is pointed out again that the movement for increasing the speed of the truck whether the truck is in reverse or forward drive is caused by a force which is always applied in the same direction, that is, downwardly against the foot pad. Thus the operator may control the forward and reverse drive and also the speed of the engine by pressure applied through the ball of his right foot rather than requiring a heel and toe operation such as is common with steam rollers and the like.

It is pointed out that any time the pump 33 is inoperative, the spring 47 will move the pad 21 to its "forward" position. Thus, the operator is assured that when starting the truck, it will be in forward drive.

In connection with the torque converter 11 it is pointed out that the fluid will pass through an outlet line 171 of the torque converter and pass through a check valve 173 and then through a filter 175, a heat exchanger 177, and a line 179 to the transmission 9. Thus the output of the torque converter is also used for cooling the transmission 9. This cooling fluid is exhausted from the transmission through the line 109 which leads to the sump 79.

Although the shift effected by the operation of the foot pad 21 is from forward to reverse, the same system could be utilized for shifting from one forward speed to a second forward speed, or from one reverse speed to another reverse speed by merely having a transmission with such drives and by having the fluid-activated clutches properly connected to such drives.

While the valve 15 is shown as being carried by the foot pad 21, it could be mounted on the frame of the truck and operated by the pad through a linkage system,

Modified pedal

The modified pedal is basically similar to the pedal shown in Figs. 1 to 3, and similar parts will be given the same reference numerals, but distinguished by the subscript *a*. Only so much of the pedal is shown as to make it clear how it could be substituted in the system of Fig. 1 for the pedal there shown.

The modified pedal includes a pad 21a which is pivotally mounted at 24a on a wing piece 49a for tilting movement about an axis extending longitudinally of the truck. However, as shown in Fig. 6, the length of the pad is oblique to such pivotal axis to make for easier engagement of the operator's foot with various parts of the pad. The wing piece 49a is an integral part of the upper end of an angularly shaped pedal arm 23a. The arm is urged by a spring 29a in a direction to position the pad 21a in an elevated position unless depressed by the foot of the operator.

The arm 23a has an enlarged lower end 201 fixed to a pivot shaft 25a which is pivoted in blocks 203 fixed to mounting pieces 204 secured to the truck frame. A throttle linkage, including a rod 205 and an arm 206 fixed to the shaft 25a, connects the shaft to the throttle of the engine.

A floor board 207 covers the lower part of the arm 23a and has an opening 209 through which the upper part of the arm 23a extends.

The pad 21a has an elastomer cover piece 211 provided with a forward drive foot engaging button 213 located on the left hand side of the pad, as the pad is viewed by the driver, and a thicker reverse drive foot engaging button 215 located on the right-hand side of the pad, as is best shown in Fig. 6.

Referring to Fig. 7, the wing piece 49a has a stop lug portion 50a to limit tilting movement of the pad one way, and a stop lug portion 50x to limit tilting movement of the pad the opposite way. When the pad is tilted said opposite way, the pad pushes downwardly on an adjustment screw 216 which is part of a valve mechanism, to be described.

A leaf spring 217 is secured at one end by a fastener 219 to one end of the wing piece 49a and is flexed so that its opposite end fits under a finger 221 on the pad 21a. The spring thus urges the pad to tilt toward its "forward drive" position and thus urges the pad to move away from the lug 50a. However, the adjustment screw and associated valve mechanism prevent the spring alone from causing such movement, but permit such movement when added pressure is applied, such as, by the foot of the operator.

Referring particularly to Figs. 4 and 7, the valve mechanism includes a bellcrank 231 located generally in the plane of the arm 23a and thus offset laterally from the vertical plane containing the pivot 24a. The bellcrank is pivoted at 233 on the upper part of the arm 23a and threadedly receives the adjustment screw 216 which is held in any position of adjustment by a jam nut 235.

As shown in Fig. 4, the lower end of the bellcrank engages one end of a rod 237 slidably received within a bore formed in the lower part of the arm 23a. The rod bears against a plunger having a right hand portion 239 slidably received within the arm 23a, the plunger projecting into an elongate cavity 241 of generally cylindrical shape which is formed in the enlarged arm portion 201. The portion 201 functions as a valve body and will be so referred to hereinafter.

The plunger is reduced to provide a small plunger portion 251 extending through a bore 253 formed in a tubular seat member 255. The bore 253 has a diameter slightly larger than the diameter of the portion 239 of the plunger to enable such portion to project into the bore when the pad 21a is against the stop 50x. Portion 239 therefore acts as a valve when so projected to cut off flow-through bore 253. The plunger terminates in an enlarged valve portion 257 to seat against the left-hand end of the seat member 255. Preferably the screw 216 is adjusted so that it is spaced slightly from the pad when the pad is against the stop 50 to assure that the portion 257 may seat against the seat 255.

The seat member has a press fit within the cavity 241, there being a shoulder 267 to determine the location of the seat member so that a port 269 in the seat member registers with a flow passage 63a, formed in the valve body 201. The flow passage 63a provides a continuation of a conduit 63b leading to the selector valve, not shown in Figs. 4 to 7.

The valve body 201 is also formed with a flow passage 83a, best shown in Fig. 5, which communicates with the forward portion of the cavity 201 and forms a continuation of a conduit 83b leading to the sump, not shown in Figs. 4 to 7.

When the valve portion 257 is seated against the seat member 255, the pressure in the left-hand end of the cavity 241 is sufficient to hold the valve portion in such position despite the opposing pressure of the leaf spring 217 which acts through the screw 216, bellcrank 231 and rod 237 against the plunger 239. However, when the valve portion 257 is separated from the seat member, because of foot pressure on the reverse button 215, the plunger portion 239 will be projected slightly into the seat member 255 and will remain there because the pressure in the left-hand end of the cavity 241 acts against a smaller area, namely the area of cross section of the plunger portion 239. Thus the force of the spring 217 is sufficient to hold the pedal pad in its "reverse drive" position until it is moved therefrom. The modified pedal thus operates in a manner similar to that of the first-described pedal.

The buttons 213 and 215 are made of different heights to prevent the operator from inadvertently pressing on the reverse button when the truck is in forward drive, since the operator must raise his foot slightly in order to engage the face of the reverse drive button. The driver is also made aware when he is shifting from reverse to forward drive, since his foot will drop downwardly from the higher reverse button 215 to the lower forward button 213.

The functions of the valves 41, 43 and 45, previously mentioned, are as follows. The valve 41 is a pressure control valve to maintain pressure in the line 35 so that there will always be enough to operate the brake or the valve spool extension 117. The valve 43 is a pressure control valve to assure that the pressure in the line 35 is always enough to operate the clutches. The valve 45 is a relief valve to dump excess flow. The passages through the torque converter will not take the full flow without building up undue back pressure so the excess is dumped to the tank through the valve 45.

Another modified arrangement

Referring to Fig. 8, the pedal has an arm 23b mounted for movement about a transverse axis. The arm has a wing piece 49b on which a pad 21b is mounted at 24b for pivotal movement about a longitudinal axis. A spring pressed ball detent 301 fits in either of two notches or recesses 303 to releasably hold the pad in its "forward" position or its "reverse" position.

When the pad is tilted to its reverse position, a switch actuator 305, which is slidably received by the wing piece 49b, closes a switch 307 which is mounted on the wing piece. Closure of this switch closes a circuit through a solenoid coil 309 to pull an armature 311 to the right. The armature is connected to the end 75b of the movably valve member of the selector valve 13b, and thus the selector valve is moved to the right to shift the associated transmission (not shown) into reverse drive.

A spring 313 urges the armature to the left, so that when the pad 21b is tilted the opposite way and the switch 307 opened, the deenergization of the coil 309 will enable the spring 313 to return the selector valve to its "forward" position.

A battery 143b supplies energy to the circuit through an ignition switch 141b.

Further modified pedal arrangement

Referring to Fig. 9, the pedal includes an arm 401 pivoted about a transverse axis and having a fixed head or pad 403. A "forward" microswitch 405 is mounted on the left hand side of the pad and its operating button 407 projects through an opening in the pad in a position to be depressed by the foot of the operator. A similar "reverse" microswitch 409 has a button 411 similarly located on the right hand side of the pad.

The "forward" switch 405 serves to energize a solenoid coil 421 when its button 407 is depressed, while switch 409 similarly affects a coil 423 when its button 411 is depressed. A battery 141c supplies energy to the coils when the buttons are depressed. The coils and switches are arranged in parallel circuits for independent action.

The coils have a common armature 425 having an extension 427 slidably received by a valve body 429 of a valve 13c. A spring pressed ball detent 431 in the body alternately fits in two recesses 433 in the extension to releasably hold the extension in a left hand or right hand position. The extension is connected to the portion 75c of the valve element of the selector valve 13c for operation of the selector valve in a manner previously described.

When switch 405 is closed, the selector valve is moved to its "forward" position because of the operation of the coil 421, whereas when switch 409 is closed, the valve is moved to its "reverse" position because of the operation of the coil 423.

It is evident that the various coils in Figs. 8 and 9 could be energized through relays rather than directly, if desired.

Having described the invention in what is considered to be the preferred embodiments thereof, it is desired that it be understood that the invention is not to be limited other than by the provisions of the following claims.

I claim:

1. In a drive system for a vehicle, a throttle pedal including a pedal arm having a foot rest end, means spaced from said foot rest end and pivotally mounting said pedal for bodily movement of said foot rest end about the pivotal axis of said arm, foot operated means carried by said pedal at the foot rest end thereof and operable when actuated one way for placing said vehicle in a first drive, and operable when actuated a second way for placing said vehicle in a second drive different from said first drive, and means for releasably holding said vehicle in the drive in which it is placed despite release of pressure on the foot operated means.

2. In a drive system for a lift truck having a throttle and having a transmission providing a forward drive and a reverse drive, a pedal mounted for pivotal movement, means responsive to pivotal movement of the pedal for operating the throttle of the truck, said pedal including a foot pad mounted for tilting movement about an axis different from said pedal axis, and means responsive to the movement of the pad one way to place the truck in forward drive and responsive to movement of the pad the other way to place the truck in reverse drive, and means for releasably holding said pad in either tilted position to which it is moved until said pad is positively moved from any such position.

3. In a drive system for a lift truck having a throttle and having a transmission providing a forward fluid-activated friction clutch and a reverse fluid-activated friction clutch, a pedal mounted for pivotal movement, means responsive to pivotal movement of the pedal for operating the throttle of the truck, said pedal including a foot pad mounted for tilting movement about an axis different from said pedal axis, fluid supply means for supplying fluid under pressure to said clutches, and means controlling the fluid supply means and responsive to the movement of the pad one way to facilitate the supply of fluid to said forward clutch and responsive to movement of the pad the other way to facilitate the supply of fluid to said reverse clutch and means for releasably holding said pad in either position to which the pad is moved to hold said truck in either forward or reverse drive until the pad is positively moved from the position to which it has previously been moved.

4. In a drive system for a lift truck having a throttle and having a transmission providing a forward drive and a reverse drive, a pedal mounted for pivotal movement, means responsive to pivotal movement of the pedal for operating the throttle of the truck, said pedal including a foot pad mounted for tilting movement about an axis different from said pedal axis, and means responsive to the movement of the pad one way to place the truck in forward drive and responsive to movement of the pad the other way to place the truck in reverse drive, and hydraulic means for releasably holding said pad in either tilted position to which it is moved until said pad is positively moved from any such position.

5. In a drive system for a lift truck having a throttle and having a transmission providing a forward drive and a reverse drive, a pedal mounted for pivotal movement, means responsive to pivotal movement of the pedal for operating the throttle of the truck, said pedal including a foot pad mounted for tilting movement about an axis different from said pedal axis, a fluid circuit associated with said pad including a valve and a connection between said valve and said pad for operating said valve one way when said paid is moved one way and for operating said valve a different way when said pad is moved the opposite way, means controlled by said valve to place said truck in forward drive when the valve is operated one way and to place said truck in reverse drive when the valve is operated said different way, and means for releasably holding said valve in either position despite release of pressure on said pad.

6. In a drive system for a lift truck having a throttle and having a transmission providing a forward drive and a reverse drive, a pedal mounted for pivotal movement, means responsive to pivotal movement of the pedal for operating the throttle of the truck, said pedal including a foot pad mounted for tilting movement about an axis different from said pedal axis, a fluid circuit associated with said pad including a valve carried by said pedal arm and a connection between said valve and said pad for operating said valve one way when said pad is moved one way and for operating said valve a different way when said pad is moved the opposite way, means controlled by said valve to place said truck in forward drive when the valve is operated one way and to place said truck in reverse drive when the valve is operated said different way, and means for releasably holding said valve in either position despite release of pressure on said pad.

7. In a drive system for a lift truck having a throttle and having a transmission providing a forward drive and a reverse drive, a pedal mounted for pivotal movement, means responsive to pivotal movement of the pedal for operating the throttle of the truck, said pedal including a foot pad mounted for tilting movement about an axis different from said pedal axis, a fluid circuit associated with said pad including a valve carried by said pedal arm locally of the pivotal axis of said pedal arm and a connection between said valve and said pad for operating said valve one way when said pad is moved one way and for operating said valve a different way when said pad is moved the opposite way, means controlled by said valve to place said truck in forward drive when the valve is operated one way and to place said truck in reverse drive when the valve is operated said different way, and means for releasably holding said valve in either position despite release of pressure on said pad.

8. In a control system for a vehicle transmission, a throttle pedal, means mounting said pedal for movement from a raised position to various lowered positions, a stop limiting upward movement of said pedal, yieldable means holding said pedal against said stop, said pedal having a foot engaging pad, means associated with said pad and responsive to downward pressure on one side of said pad for placing said transmission in a first drive and responsive to downward pressure on the opposite side of said pad for discontinuing the first drive and placing said transmission in a second drive, said responsive means being sufficiently pressure sensitive that the pressure required to actuate said responsive means is less than that required to separate said pedal from said stop so that a shift in the drive can be made without downward movement of said pedal.

9. A control system as described in claim 8 in which there are means for releasably holding said transmission in the drive in which it is placed despite release of pressure on the foot pad.

10. In a lift truck having a front end and a rear end, a driver's seat, a pedal device including a pedal arm, a foot-engaged member on one end of said arm, means mounting said arm with said foot-engaged member uppermost and for pivotal movement of said arm about a transverse axis for generally downward movement of said foot-engaged member under the influence of a foot pressure applied against said foot-engaging member in a direction generally normal to the face of said member, said transverse axis being located forwardly and below said driver's seat a distance to dispose said foot-engaged member at a location for ready engagement by a foot of a driver seated in said driver's seat, said foot engaged member being mounted on the upper end of said arm for pivotal movement about an axis extending generally at right angles to the pedal arm axis and located generally centrally relative to said arm, means yieldingly urging said arm in a direction to elevate said foot-engaged member to an upper position, stop means limiting upward movement of said foot-engaged member to said upper position, said truck having a throttle, means responsive to pivotal movement of said arm to increase the throttle setting, a transmission, power means operable when acuated for shifting said transmission from one speed to another, responsive means for actuating said power means and having parts associated with said foot-engaged member and disposing said foot-engaged member in a generally horizontal position considered laterally of said truck and restricting said foot-engaged member to pivotal movement in the order of a small, minor acute angle so that foot pressure applied normal to a portion of said foot-engaging member on one side of the foot-engaged member axis first tilts said foot-engaged member one way and then pivots said pedal arm as a continuous sequence resulting from the application of a foot-applied force in a single direction, and so that a force applied normal to a portion of said foot-engaged member on the other side of the foot-engaged member axis will first tilt the foot-engaged member the opposite way and then pivot said pedal arm as a continuous sequence resulting from the application of a foot-applied force in a single direction, said responsive means for said power means including sensing means responsive to slight tilting movement of said foot-engaged member one way for immediately actuating said power means one way and responsive to slight tilting movement of said foot-engaged member the opposite way for immediately actuating said power means the other way, the resistance of said foot-engaged member to tilting movement being substantially less than the force necessary to fully depress said foot-engaged member and arm so that said foot-engaged member is tilted prior to any substantial pivotal movement of said arm so that the transmission is shifted prior to substantial speeding up of the engine of the truck.

References Cited in the file of this patent

UNITED STATES PATENTS

| | | |
|---|---|---|
| 1,402,131 | Alspaugh | Jan. 3, 1922 |
| 2,008,149 | Mossinghoff | July 16, 1935 |
| 2,118,178 | Eastin | May 24, 1938 |
| 2,600,767 | Herrell | June 17, 1952 |

UNITED STATES PATENT OFFICE
CERTIFICATION OF CORRECTION

Patent No. 2,968,967                  January 24, 1961

Cecil J. Ross, Jr.

It is hereby certified that error appears in the above numbered patent requiring correction and that the said Letters Patent should read as corrected below.

Column 2, line 33, and column 3, line 21, for "food", each occurrence, read -- foot --; column 6, line 43, for "operation" read -- operator --.

Signed and sealed this 6th day of June 1961.

(SEAL)
Attest:

ERNEST W. SWIDER                  DAVID L. LADD
Attesting Officer                  Commissioner of Patents